(12) United States Patent
Yamamoto

(10) Patent No.: US 10,086,437 B2
(45) Date of Patent: Oct. 2, 2018

(54) CUTTING TOOL

(71) Applicant: KYOCERA Corporation, Kyoto-shi, Kyoto (JP)

(72) Inventor: Shinsuke Yamamoto, Satsumasendai (JP)

(73) Assignee: KYOCERA CORPORATION, Kyoto-Shi, Kyoto (JP)

( * ) Notice: Subject to any disclaimer, the term of this patent is extended or adjusted under 35 U.S.C. 154(b) by 469 days.

(21) Appl. No.: 14/766,915

(22) PCT Filed: Feb. 13, 2014

(86) PCT No.: PCT/JP2014/053388
§ 371 (c)(1),
(2) Date: Aug. 10, 2015

(87) PCT Pub. No.: WO2014/126178
PCT Pub. Date: Aug. 21, 2014

(65) Prior Publication Data
US 2015/0367421 A1    Dec. 24, 2015

(30) Foreign Application Priority Data

Feb. 13, 2013   (JP) ................................ 2013-025686
Feb. 26, 2013   (JP) ................................ 2013-036042

(51) Int. Cl.
*B23C 5/20*     (2006.01)
*B23B 27/14*    (2006.01)
(Continued)

(52) U.S. Cl.
CPC .......... *B23B 27/148* (2013.01); *C04B 35/584* (2013.01); *C04B 35/5935* (2013.01);
(Continued)

(58) Field of Classification Search
CPC . B23B 27/148; B23B 224/36; B23B 2228/10; B23B 2228/24; B23C 30/005;
(Continued)

(56) References Cited

U.S. PATENT DOCUMENTS 4,461,799 A * 7/1984 Gavrilov ................. B23P 15/28
                                                      148/280
4,828,934 A * 5/1989 Pinkhasov ............ C04B 41/009
                                                      427/404
(Continued)

FOREIGN PATENT DOCUMENTS

EP         1043292 A1    10/2000
JP         59-128270      7/1984
(Continued)

OTHER PUBLICATIONS

International Search Report (Form PCT/ISA/210) dated May 13, 2014 and issued for International Patent Application No. PCT/JP2014/053388.
(Continued)

*Primary Examiner* — Will Fridie, Jr.
(74) *Attorney, Agent, or Firm* — Volpe and Koenig, P.C.

(57) ABSTRACT

Problem: To provide a cutting tool formed from a silicon nitride-based sintered body having high fracture resistance and having residual stress of a rake face and a flank face in an appropriate range.
Solution: A cutting tool (1) formed from a silicon nitride-based sintered body containing not less than 50 volume % silicon nitride-based phase and from 10 to 30 volume % titanium nitride phase, uses an intersection ridge portion of a rake face (2) and a flank face (3) as a cutting edge (4), has a residual stress applied to the titanium nitride phase that is tensile stress, and is such that the tensile stress applied to the
(Continued)

titanium nitride phase in the rake face (2) is greater than the tensile stress applied to the titanium nitride phase in the flank face (3).

9 Claims, 1 Drawing Sheet

(51) Int. Cl.
*C04B 35/593* (2006.01)
*C04B 35/584* (2006.01)

(52) U.S. Cl.
CPC ............ *B23B 27/14* (2013.01); *B23B 2222/36* (2013.01); *B23B 2224/36* (2013.01); *B23B 2228/10* (2013.01); *B23B 2228/24* (2013.01); *C04B 2235/3217* (2013.01); *C04B 2235/3222* (2013.01); *C04B 2235/3225* (2013.01); *C04B 2235/3232* (2013.01); *C04B 2235/3267* (2013.01); *C04B 2235/3418* (2013.01); *C04B 2235/3865* (2013.01); *C04B 2235/3869* (2013.01); *C04B 2235/3873* (2013.01); *C04B 2235/3886* (2013.01); *C04B 2235/3895* (2013.01); *C04B 2235/5436* (2013.01); *C04B 2235/5445* (2013.01); *C04B 2235/6562* (2013.01); *C04B 2235/6565* (2013.01); *C04B 2235/6567* (2013.01); *C04B 2235/76* (2013.01); *C04B 2235/77* (2013.01); *Y10T 407/24* (2015.01)

(58) Field of Classification Search
CPC .............. B23C 28/044; B23C 2226/72; B23C 2226/76; C04B 35/584; C04B 41/89; C04B 35/591
See application file for complete search history.

(56) References Cited

U.S. PATENT DOCUMENTS

| | | | | |
|---|---|---|---|---|
| 2002/0010068 | A1* | 1/2002 | Komatsu | C04B 35/584 501/97.2 |
| 2002/0076284 | A1* | 6/2002 | Kato | C23C 30/005 407/114 |
| 2004/0072038 | A1* | 4/2004 | Henderer | C23C 30/005 428/698 |
| 2009/0175695 | A1* | 7/2009 | Endres | B23B 27/12 407/113 |
| 2011/0064530 | A1* | 3/2011 | Ban | B23B 27/141 407/119 |

FOREIGN PATENT DOCUMENTS

| | | |
|---|---|---|
| JP | H07-299708 A | 11/1995 |
| JP | H08-319166 A | 12/1996 |
| JP | 2003-034577 A | 2/2003 |
| JP | 2010-264574 A | 11/2010 |
| WO | 01/17928 A1 | 3/2001 |

OTHER PUBLICATIONS

Extended European Search Report, European Patent Application No. 14751959.9, dated Sep. 16, 2016, 8 pgs.

* cited by examiner

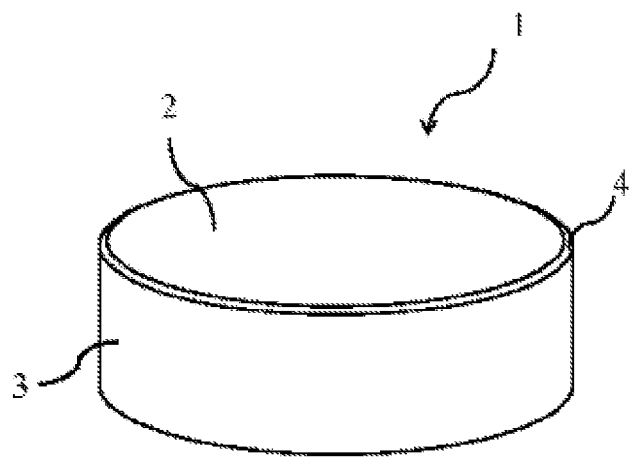

＃ CUTTING TOOL

TECHNICAL FIELD

The present invention relates to a cutting tool formed from a silicon nitride-based sintered body.

BACKGROUND

Silicon nitride-based sintered bodies having one of silicon nitride and SiAlON as the primary component can be used under harsh cutting conditions because they are lightweight, and have excellent wear resistance, strength, and high-temperature strength. For this reason, they are advantageously employed in high-speed roughing cutting and the like.

Among such cutting tools formed from silicon nitride-based sintered bodies, for example, Patent Document 1 discloses a silicon nitride-based sintered body of which the absolute value of residual stress is from 42 to 55 MPa, and the same document describes that improved high strength at room temperature and high temperature can be achieved by setting the absolute value of residual stress to not greater than 45 MPa.

Additionally, Patent Document 2 discloses that, after grinding processing of the surface of a silicon nitride-based sintered body, compressive residual stress on the surface of the sintered body can be increased and strength that decreased due to the grinding processing can be recovered by thermal treatment in air.

Furthermore, Patent Document 3 discloses a cutting tool wherein, as residual stress at the nose of the rake face, the residual stress $\sigma_{11}$ for the direction facing the nose nearest the measurement point from the center of the rake face and parallel to the rake face is from 10 to 30 MPa ($\sigma_{11}$ is from −10 to −30 MPa) as compressive stress, and the residual stress $\sigma_{22}$ for the direction perpendicular to the direction of $\sigma_{11}$ is not greater than 10 MPa ($\sigma_{22}$ is from −10 to 0 MPa) as compressive stress.

PRIOR ART DOCUMENT

Patent Document

Patent Document 1 Japanese Unexamined Patent Application No. H08-319166A

Patent Document 2: Japanese Unexamined Patent Application No. H7-299708A

Patent Document 3: Japanese Unexamined Patent Application Publication No. 2010-264574A

SUMMARY OF THE INVENTION

Problems to be Solved by the Invention

However, with a method that controls residual stress of the entire sintered body as in the silicon nitride-based sintered body described in the above Patent Documents 1 and 2, tool performance when used as a cutting tool has not been optimized. Furthermore, even when residual stress on the rake face is appropriately adjusted as in Patent Document 3, further optimization of tool performance is required.

Thus, an object of the present invention is to provide a cutting tool formed from a silicon nitride-based sintered body having high fracture resistance and having residual stress of the rake face and the flank face in an appropriate range.

Means to Solve the Problem

The cutting tool of the present invention is formed from a silicon nitride-based sintered body containing not less than 50 volume % silicon nitride-based phase and from 10 to 30 volume % titanium nitride phase, and has a rake face, a flank face, and an intersection ridge portion of the rake face and the flank face, a residual stress applied to the titanium nitride phase being a tensile stress, and the tensile stress applied to the titanium nitride phase on the rake face being greater than a tensile stress applied to the titanium nitride phase on the flank face.

Effect of the Invention

According to the cutting tool of the present invention, in a silicon nitride-based sintered body containing a titanium nitride phase in a prescribed proportion, residual stress applied to the titanium nitride phase is tensile stress, and tensile stress applied to the titanium nitride phase on the rake face is greater than tensile stress applied to the titanium nitride phase on the flank face. As a result, on the rake face, higher compressive stress applied to the silicon nitride-based phase, which is the primary crystal phase, can reduce defects due to flaking, which readily occurs on the rake face. Furthermore, on the flank face, a smaller tensile stress in the titanium nitride phase than in the rake face can slow advancement of wear on the flank face in cutting of heat-resistant alloys such as Inconel®, and as a result, tool life can be extended.

BRIEF DESCRIPTION OF THE DRAWING

FIG. 1 is a schematic perspective view of an example of a cutting tool of the present invention.

BEST MODE FOR CARRYING OUT THE INVENTION

A cutting tool 1 of the present embodiment is formed from a silicon nitride-based sintered body containing not less than 50 volume % silicon nitride-based phase and from 10 to 30 volume % titanium nitride phase. As illustrated in the schematic perspective view of FIG. 1, the cutting tool 1 uses an intersection ridge portion of a rake face 2 and a flank face 3 as a cutting edge 4.

Thus, according to the present invention, the residual stress in the titanium nitride phase is tensile stress, and tensile stress in the titanium nitride phase on the rake face 2 is greater than tensile stress in the titanium nitride phase on the flank face 3. As a result, defects due to flaking, which readily occurs on the rake face 2, can be reduced. Specifically, on the rake face 2, applying high compressive stress to the silicon nitride-based phase on the rake face 2, which are primarily crystal phases, can reduce defects due to flaking, which readily occurs on the rake face 2. On the flank face 3, on the other hand, flank face wear is reduced in cutting of heat-resistant alloys. It is unclear why advancement of wear on the flank face 3 in cutting of heat-resistant alloys such as Inconel® is slowed when the residual stress on the flank face 3 is smaller than the residual stress on the rake face 2, but it is thought that a cause may be the fact that, under harsh cutting conditions like those of cutting of heat-resistant alloys such as Inconel®, residual stress on the rake face 2 is large when the residual stress on the flank face 3 is large, and as a result, the residual stress applied to the cutting edge 4 is excessive, and tiny chipping occurs in the cutting edge 4 by self-destruction when the cutting tool 1 is produced.

Residual stress in the present invention is measured at a position not less than 1 mm toward the inside (center side) from the cutting edge 4 of the rake face 2 and the flank face 3. An X-ray diffraction method is used for measurement of residual stress. In the present embodiment, measurement is performed using the 2D method (multi-axial stress measurement method and full Debye ring fitting method) among X-ray diffraction methods, but a general X-ray diffraction apparatus may also be used. Furthermore, the X-ray diffraction peaks used in measurement of residual stress are the peaks of the TiN (511) face appearing at a 2θ value of from 130 to 140°. Residual stress is calculated using a Poisson ratio of 0.19 and a Young's modulus of 438.596 MPa of titanium nitride. As for X-ray diffraction measurement conditions, residual stress is measured by irradiating a CuKα beam with power of 45 kV, 110 mA as the X-ray source. When residual stress is positive, it is tensile stress, and when negative, it is compressive stress.

Here, in the present embodiment, the residual stress applied to the titanium nitride phase of the rake face 2 is tensile stress of from 200 to 400 MPa, and preferably from 250 to 350 MPa, and the residual stress applied to the titanium nitride phase of the flank face 3 is tensile stress of from 100 to 300 MPa, and preferably from 150 to 250 MPa. As a result, toughness of the sintered body can be improved without self-destruction due to excessive tensile stress, and flaking on the rake face 2 and chipping on the cutting edge 4 can be slowed, and advancement of wear on the flank face 3 can be reduced.

Furthermore, in the present embodiment, the difference in tensile stress of the titanium nitride phase on the rake face 2 and the flank face 3 is from 20 to 150 MPa, and preferably from 50 to 100 MPa. As a result, adjusting the difference in this range prevents chipping caused by the excessive difference in the tensile stress of the rake face 2 and the flank face 3 and slows advancement of wear on the flank face 3.

Here, in the silicon nitride-based sintered body, in the present embodiment, it is desirable that the peak intensity ratio of the peak of the (111) face relative to the total titanium nitride peaks of the titanium nitride phase on the surface is greater than the peak intensity ratio of the peak of the (111) face relative to the total titanium nitride peaks of the titanium nitride phase on the interior. Preferably, the peak intensity ratio of the peak of the (111) face relative to the total titanium nitride peaks of the titanium nitride phase on the surface is from 1.1 to 1.4 as a ratio relative to the peak intensity ratio of the peak of the (111) face relative to the total titanium nitride peaks of the titanium nitride phase on the interior. As a result, hardness on the surface of the sintered body can be improved, improving the wear resistance on the surface, and also, the interior of the sintered body has a structure having high toughness and strength, and a cutting tool that reduces sudden insert fracture and exhibits stable cutting performance can be obtained.

Note that in the present invention, "interior" is defined as the region at a depth of not less than 1000 μm from the surface of the sintered body. Furthermore, in the present invention, when measuring the peak intensity ratio of each of the phases by X-ray diffraction measurement, measurement is performed at 2θ values of from 10 to 80° by irradiating a CuKα beam with power of 45 kV, 110 mA as the X-ray source.

In the present embodiment, the arithmetic mean roughness (Ra) on the rake face 2 of the cutting tool 1 is from 0.2 to 0.6 μm. As a result, the strength, wear resistance, and chipping resistance of the sintered body can be increased.

Here, the overall composition of the sintered body is not less than 50 volume % silicon nitride-based phase, and from 10 to 30 volume %, preferably from 15 to 25 volume %, titanium nitride phase, and the remainder grain boundary phase. The grain boundary phase contains silica ($SiO_2$) obtained by decomposition of the silicon nitride-based phase, aluminum compounds such as aluminum oxide ($Al_2O_3$) in which any one of aluminum oxide powder and aluminum nitride powder added as a raw material has been modified, and RE element compounds such as RE element oxides in which RE element compound powder has been modified. The grain boundary phase is present as an amorphous phase, but part of it may be crystallized. Furthermore, in the present embodiment, phases other than the silicon nitride-based phase and the titanium nitride phase are considered to be grain boundary phase. The RE element in the present invention indicates yttrium (Y) and rare earth metals.

For densification of the sintered body, the RE element component is added such that the content thereof in the present embodiment is from 0.5 to 10 mass % in terms of $RE_2O_3$ relative to the entire sintered body. The desired range of RE element component content is from 1 to 8 mass %. To reduce a decrease in the liquid phase formation temperature of the sintering aid and to reduce a decrease in wear resistance due to a decrease in oxidation resistance and densification of the sintered body, the content of aluminum component in the present embodiment is from 0 to 15 mass % in terms of $Al_2O_3$, and particularly preferably from 3 to 10 mass %. When the RE element component is yttrium, yttrium and aluminum are present divided among a portion present at the grain boundaries as a glass phase, a portion that constitutes a melilite phase, a portion that constitutes a YAG phase, and a component that constitutes SiAlON. Titanium nitride increases toughness of the sintered body, and is present as a dispersed phase in a proportion of from 10 to 45 mass %, and particularly from 10 to 30 mass %, in terms of TiN relative to the entire sintered body.

The silicon nitride-based phase is present primarily as a crystal, but specifically, it is present primarily as one of a β-SiAlON phase and as a β-silicon nitride phase. Furthermore, in the present embodiment, the Z value of the β-SiAlON phase (value that expresses the amount of Al and O elements present in the β-SiAlON phase: the values of Z when the SiAlON phase is represented by $Si_{6-Z}Al_ZO_ZN$) is from 0.01 to 0.3. As a result, an excellent tool life is exhibited particularly when cutting heat-resistant alloys like Inconel® 718. Additionally, part of the β-silicon nitride phase may be α-silicon nitride phase, and part of the β-SiAlON phase may be α-SiAlON phase. In the present embodiment, to increase the strength of the sintered body, the proportion of α-silicon nitride-based phase relative to the silicon nitride-based phase as a whole (a ratio) is from 0 to 0.3.

Here, in the present embodiment, in X-ray diffraction measurement of the silicon nitride-based sintered body, the peak intensity ratio of the peak of the silicon nitride-based phase relative to the total peaks on the surface is smaller than the peak intensity ratio of the peak of the silicon nitride-based phase relative to the total peaks on the interior. Preferably, the peak intensity ratio of the peak of the silicon nitride-based phase relative to the total peaks on the surface is from 0.05 to 0.5 as a ratio relative to the peak intensity ratio of the peak of the silicon nitride-based phase relative to the total peaks on the interior. Here, the peak intensity of the total peaks on the surface is the total of peak intensity of all peaks detected in X-ray diffraction patterns measured on the surface of the silicon nitride-based sintered body, and the peak intensity of the peak of the silicon nitride-based phase on the surface is the total of peak intensity of all peaks of the silicon nitride-based phase detected in X-ray diffraction patterns measured on the surface. The peak intensity of the total peaks on the interior is the total of peak intensity of all peaks detected in X-ray diffraction patterns measured on the interior of the silicon nitride-based sintered body, and the peak intensity of the peak of the silicon nitride-based phase on the interior is the total of peak intensity of all peaks of the silicon nitride-based phase detected in X-ray diffraction patterns measured on the interior.

In the present embodiment, the peak intensity ratio of the peak of the melilite phase relative to the total peaks on the surface is greater than the peak intensity ratio of the peaks of the melilite phase relative to the total peaks on the interior. Preferably, the peak intensity ratio of the peak of the melilite phase relative to the total peaks on the surface is from 3.0 to 6.0 as a ratio relative to the peak intensity ratio of the peak of the melilite phase relative to the total peaks on the interior. Here, the peak intensity of the peak of the melilite phase on the surface is the total of peak intensity of all peaks of the melilite phase detected in X-ray diffraction patterns measured on the surface of the silicon nitride-based sintered body. The peak intensity of the peak of the melilite phase on the interior is the total of peak intensity of all peaks of the melilite phase detected in X-ray diffraction patterns measured on the interior of the silicon nitride-based sintered body.

Additionally, the peak intensity ratio of the peak of the (201) face relative to the total melilite peaks of the melilite phase on the surface is greater than the peak intensity ratio of the peak of the (201) face relative to the total melilite peaks of the melilite phase on the interior. Preferably, the peak intensity ratio of the peak of the (201) face relative to the total melilite peaks of the melilite phase on the surface is from 1.1 to 2.0 as a ratio relative to the peak intensity ratio of the peak of the (201) face relative to the total melilite peaks of the melilite phase on the interior. Here, the peak intensity ratio of the peak of the (201) face relative to the total melilite peaks of the melilite phase on the surface is the ratio of the peak intensity of the peak of the (201) face of the melilite phase relative to the total of peak intensity of the peaks of the melilite phase, which is the peak intensity of the melilite phase on the surface. The peak intensity ratio of the peak of the (201) face relative to the total melilite peaks of the melilite phase on the interior is the ratio of the peak intensity of the peak of the (201) face of the melilite phase relative to the total of peak intensity of the peaks of the melilite phase, which is the peak intensity of the melilite phase on the interior.

As a result, decreases in strength and hardness of the silicon nitride-based sintered body can be made small even when the surface of the silicon nitride-based sintered body has become hot. Furthermore, it was found that on the interior, a higher peak intensity other than the peak of the (201) face improves strength and toughness of the sintered body at room temperature. As a result, sudden insert fractures of the silicon nitride-based sintered body can be reduced, and stable cutting performance can be exhibited.

For this reason, in a cutting tool formed from the above silicon nitride-based sintered body, under cutting conditions in which the temperature of the cutting edge provided on the surface of the sintered body becomes hot and the temperature on the interior of the sintered body does not increase as much, as in high-speed wet cut processing conditions, tool damage such as crater wear and abnormal wear from flaking and tiny chipping is reduced in the cutting edge. Furthermore, fracture resistance on the interior of the sintered body also improves.

The silicon nitride-based sintered body further includes a YAG ($3Y_2O_3 \cdot 5Al_2O_3$) phase as the grain boundary phase, and the peak intensity ratio of the peak of the (420) face of the YAG phase relative to the total peaks on the surface is from 0.8 to 1.1, and particularly from 0.85 to 0.97, as a ratio relative to the peak intensity ratio of the peak of the YAG phase relative to the total peaks on the interior. As a result, hardness of the sintered body at high temperature can be improved and the difference in thermal expansion between the surface and the interior can be reduced and fracture resistance of the sintered body increased. In the present embodiment, the peak intensity ratio of the peak of the (420) face of the YAG phase relative to the total peaks on the interior is from 0.010 to 0.0150.

Furthermore, in the present embodiment, the sintered body may also contain a silicide of an element of group VI of the periodic table. By so doing, a reduction in high-temperature strength can be reduced and the color of the sintered body can be blackened. Examples of the silicide of an element of group VI of the periodic table include chromium silicide, molybdenum silicide, and tungsten silicide, but the use of tungsten silicide is preferred because the use of tungsten silicide enables fine oxide raw material to be present as fine grains in the sintered body. Furthermore, silicide grains of an element of group VI of the periodic table are present as a dispersed phase in the silicon nitride-based sintered body.

Additionally, the cutting tool 1 may have a hard coating layer of TiN, $Al_2O_3$, TiAlN, or the like on the surface of the sintered body.

Next, a method for manufacturing the sintered body will be described.

First, as starting raw materials, for example, silicon nitride ($Si_3N_4$) powder, RE element hydroxide ($RE(OH)_2$) or oxide ($RE_2O_3$), aluminum oxide ($Al_2O_3$), aluminum nitride (AlN), and titanium nitride (TiN) are prepared.

The silicon nitride raw material may be α-silicon nitride powder, β-silicon nitride powder, or a mixture thereof. The average grain size of these silicon nitride raw materials is preferably not greater than 1 μm, and particularly preferably not greater than 0.5 μm.

In the present embodiment, oxide powder of average grain size from 0.5 to 5 μm is used as the RE element raw material. As the titanium nitride (TiN), powder of average grain size from 0.5 to 5 μm is used. The added amount of RE element oxide is from 0.5 to 10 volume %, and preferably from 1 to 8 volume %, in terms of $RE_2O_3$. As a result, densification of the sintered body is promoted. The added amount of aluminum nitride is from 0 to 10 mass %, and particularly from 3 to 8 mass %, in terms of AlN. The added amount of aluminum oxide is from 0 to 10 mass %, and particularly from 1 to 5 mass %, in terms of $Al_2O_3$. By using these aluminum compounds, densification of the sintered body can be promoted by producing a liquid phase at low temperature, and oxidation resistance and wear resistance of the sintered body can be improved. As the raw material for forming the silicide of an element of group VI of the periodic table, an oxide, carbide, silicide, nitride, or the like of an element of group VI of the periodic table may be used, but use of an oxide is preferred because fine powder thereof can be obtained easily and inexpensively. The average grain size of the powders of raw materials such as aluminum nitride, aluminum oxide, and oxide, silicide, or nitride of an element of group VI of the periodic table is from 0.5 to 5 μm.

Furthermore, from 0 to 10 mass % magnesium oxide (MgO) and from 0 to 10 mass % silica ($SiO_2$) may be added as desired. Additionally, a raw material powder of an oxide, carbide, silicide, nitride, or the like of an element of group VI of the periodic table may be added to form a silicide of the element of group VI of the periodic table. Use of an oxide is preferred because fine powder thereof can be obtained easily and inexpensively. Powder of average grain size from 0.5 to 5 μm is used for these raw materials.

Next, appropriate binders and solvents are added to a mixed powder obtained by weighing these raw materials, and they are mixed and ground, dried by a spray drying method or the like, and granulated. Then, this granulated powder is molded into a prescribed cutting tool shape by press molding. When molded, it is important that the molded densities differ on the main face of the powder compact, which serves as the rake face, and the side faces of the powder compact, which serve as the flank face. An example of the method for making the molded densities on the main face and the side faces of the powder compact different is to increase the movement speed of the upper and lower punches of the die together with decreasing the time under load when press molding. Other methods for making the molded densities on the main face and the side faces of the powder compact different are to adjust the grain size or hardness of the granules used in molding, the flowability of the granules, the hardness of the binder, the added amount of binder, and the like.

In order to obtain an advantageous content ratio of crystal phases on the surface of the silicon nitride-based sintered body, in a saggar, the powder compact may be coated with a paste (Mn paste) containing mixed powder obtained by mixing $MnO_2$ powder and $Si_3N_4$ powder in a mass ratio of from 1:5 to 1:50, and then dried, and fired in that state. The $MnO_2$ powder attaches to the surface of the powder compact and acts as a catalyst to promote firing of the surface of the sintered body. As a result, the surface and the interior of the sintered body are in different states, and the surface state of the sintered body can be adjusted to a prescribed range. The $MnO_2$ powder also attaches to the surface of the sintered body and acts as a catalyst to promote firing of the surface of the sintered body. As a result, the surface and the interior of the sintered body are in different states, and the surface state of the sintered body can be adjusted to a prescribed range. The $MnO_2$ powder volatilizes from the surface of the sintered body during firing, and does not remain in the sintered body after firing.

After that, it is fired under the following conditions. Specifically, the aforementioned powder compact is put in a firing furnace, and after the interior of the firing furnace is set to a nitrogen atmosphere at pressure from 101 to 1011 Pa (from 1 to 10 atm), the temperature is raised at a rate of from 1 to 10°/minute, and held at a firing temperature of from 1650 to 1800° C. for from 1 to 5 hours. Then, it is cooled at a first temperature decrease rate of from 1 to 9° C./minute from the firing temperature to a holding temperature of from 1250 to 1600° C., then held at the holding temperature for from 1 to 4 hours, and then cooled at a second temperature decrease rate of from 10 to 50° C./minute to room temperature.

According to the present embodiment, by holding at from 1250 to 1600° C. in the course of cooling after firing, volume expansion occurs between the silicon nitride and SiAlON and the titanium nitride due to the difference between the thermal expansion coefficient of silicon nitride (linear thermal expansion coefficient from room temperature to 1420° C.: $3.5 \times 10^{-6}$) and the thermal expansion coefficient of SiAlON (linear thermal expansion coefficient from room temperature to 1000° C.: $3.2 \times 10^{-6}$) and the thermal expansion coefficient of titanium nitride (linear thermal expansion coefficient from room temperature to 1000° C.: $9.4 \times 10^{-6}$). At this time, since the molded densities on the main face, which is the rake face, and the side faces, which is the flank face, are different, the volume expansions of the silicon nitride and SiAlON and the titanium nitride on the rake face and flank face also differ. As a result, after holding at the holding temperature, by cooling at a temperature decrease rate of from 10 to 50° C./minute from the holding temperature to room temperature, residual stress of the silicon nitride and SiAlON and the titanium nitride in the rake face and the flank face can be set in a prescribed range. Furthermore, by decreasing from the firing temperature to within the range of from 1450 to 1600° C. at a rate of from 1 to 10° C./minute and then holding for from 1 to 4 hours at that temperature, the melilite phase on the surface can be crystallized within this holding time with an orientation within the scope of the present invention. At this time, the titanium nitride phase also orients in a certain direction accompanying generation of the melilite phase.

Then, the sintered body described above undergoes grinding processing. As the specific polishing processing, the rake face is processed by double-disc grinding, and the flank face is processed by circumferential grinding. After that, as desired, the cutting edge is polished using such as wheel brush polishing or polishing using an elastic grindstone to provide one of chamfer honing and R honing on the cutting edge.

Additionally, a hard coating layer of TiN, $Al_2O_3$, TiAlN, or the like may be formed on the surface of the sintered body by the CVD or PVD vapor-phase synthesis method.

Working Example 1

As starting raw materials, silicon nitride ($Si_3N_4$) powder of average grain size 0.3 μm, RE element oxide powder of average grain size 1.2 μm, aluminum oxide ($Al_2O_3$) powder of average grain size 0.7 μm, aluminum nitride (AlN) powder of average grain size 0.7 μm, and titanium nitride (TiN) powder of average grain size 2.5 μm were compounded in the proportions shown in Table 1, and after a binder and solvent were added, they were ground and mixed for 72 hours by attritor milling.

After that, granulated powder was produced by drying to remove the solvent, and this granulated powder was packed into press molding dies having an SNMG1204 shape and an RNGN1204 shape. Then, it was press molded under a compacting load of 3000 kg while adjusting the movement speed of the upper and lower punches and the time for which load was applied. Raw density was measured for 10 powder compacts having an SNMG1204 shape. The upper and lower faces of the 10 powder compacts were polished 1 mm of thickness at a time, and raw density was measured. The four side faces of the 10 powder compacts were polished 1 mm of thickness at a time, and raw density was measured. Their respective average values were calculated, and the ratio of raw densities of the rake face and the flank face (rake face/flank face) was calculated and described as the raw density ratio. It is denoted as "raw density ratio" in the table.

This powder compact was set in a saggar, and after degreasing, the interior of the firing furnace was set to 911 Pa (9 atm) of nitrogen, and it was sintered under the firing conditions shown in Table 1 to produce a sintered body. The firing time was 2 hours. In the table, the first temperature decrease rate from the firing temperature to the holding temperature of from 1250 to 1600° C. is denoted as "temperature decrease rate 1", the holding time at the holding temperature is denoted as "holding time", and the second temperature decrease rate from the holding temperature to room temperature is denoted as "temperature decrease rate 2". Additionally, on the surfaces of the sintered body, the rake face underwent double-disc grinding processing, the flank face underwent circumferential grinding processing, and the cutting edge underwent chamfer honing processing so as to result in a 0.10 mm×20° shape using an elastic grindstone, thereby producing a cutting tool.

For the obtained silicon nitride-based sintered body, after the rake face and the flank face were put in the mirror state, the residual stress of titanium nitride on the rake face and the flank face was measured using the 2D method (X-ray diffraction apparatus D8 Discover with GADDS Super Speed; Bruker AXS Corp.; beam source CuK$_\alpha$, power 45 kV, 110 mA, detector distance 15 cm, collimator diameter 0.8 mmφ), measurement diffraction line 140° (TiN (511) face)). Furthermore, when the X-ray diffraction peaks were checked, the presence of a silicon nitride-based phase (α-SiAlON phase, β-SiAlON phase) and a titanium nitride phase in the sample was ascertained. The Z value of the β-SiAlON phase in the silicon nitride-based phase was in the range of from 0.01 to 0.3 for all samples other than sample no. 6. For sample no. 6, the presence of a α-SiAlON phase and a β-SiAlON phase could not be ascertained, and it consisted of a sintered body of silicon nitride substance.

The polished cross-sectional constitution of the sintered body was observed using a scanning electron microscope (SEM), and through energy dispersive spectroscopic (EPMA) analysis, element mapping of Si and Ti elements was performed, and silicon nitride-based phase and titanium nitride phase were identified. Then, through Luzex image analysis, the existence ratio of silicon nitride-based phase and titanium nitride phase was determined as area %, and that was taken to be volume %. The results are as shown in Table 2.

TABLE 1

| Sample No | Raw material composition (mass %) | | | | | | Powder compact |
|---|---|---|---|---|---|---|---|
| | Si$_3$N$_4$ | RE$_2$O$_3$ Type | RE$_2$O$_3$ Added amount | Al$_2$O$_3$ | AlN | TiN | Raw density ratio |
| 1 | Remainder | La$_2$O$_3$ | 7.7 | 2.4 | 3.2 | 25.2 | 1.036 |
| 2 | Remainder | Er$_2$O$_3$ | 6.8 | 4.0 | 7.6 | 14.6 | 1.050 |
| 3 | Remainder | Y$_2$O$_3$ | 6.5 | 2.0 | 6.0 | 27.5 | 1.032 |
| 4 | Remainder | La$_2$O$_3$ | 8.3 | 4.8 | 9.3 | 42.8 | 1.010 |
| 5 | Remainder | La$_2$O$_3$ | 9.7 | 0 | 9.5 | 35.6 | 1.017 |
| 6 | Remainder | Y$_2$O$_3$ | 2.4 | 0 | 0 | 21.5 | 1.022 |
| 7 | Remainder | Y$_2$O$_3$ | 8.9 | 3.1 | 2.3 | 36.1 | 1.049 |
| 8 | Remainder | Er$_2$O$_3$ | 3.5 | 1.1 | 0.3 | 20.2 | 1.012 |
| 9 | Remainder | Er$_2$O$_3$ | 4.8 | 5.0 | 4.7 | 30.5 | 1.044 |
| 10 | Remainder | Y$_2$O$_3$ | 5.2 | 2.9 | 3.2 | 33.3 | 1.047 |
| 11 | Remainder | Yb$_2$O$_3$ | 2.6 | 4.3 | 8.4 | 31.3 | 1.026 |
| 12 | Remainder | Y$_2$O$_3$ | 2.1 | 1.3 | 4.1 | 14.1 | 1.021 |
| 13 | Remainder | Y$_2$O$_3$ | 6.5 | 2.5 | 3.2 | 43.0 | 1.007 |
| 14 | Remainder | Yb$_2$O$_3$ | 9.2 | 5 | 9.5 | 42.0 | 1.039 |
| 15 | Remainder | La$_2$O$_3$ | 0.5 | 3.4 | 4.2 | 20.2 | 1.026 |
| 16 | Remainder | La$_2$O$_3$ | 1.5 | 2.1 | 3.3 | 27.8 | 1.021 |
| 17 | Remainder | Y$_2$O$_3$ | 5.2 | 3.0 | 4.5 | 21.5 | 1.007 |
| 18 | Remainder | Er$_2$O$_3$ | 3.0 | 1.5 | 7.8 | 30.1 | 0.972 |
| 19 | Remainder | Y$_2$O$_3$ | 0.5 | 3.4 | 4.2 | 23.2 | 1.026 |

| Sample No | Firing conditions | | | | | |
|---|---|---|---|---|---|---|
| | Temperature elevation rate (° C./min) | Firing temperature (° C.) | Temperature decrease rate 1 (° C./min) | Holding temperature (° C.) | Holding time (hours) | Temperature decrease rate 2 (° C./min) |
| 1 | 3 | 1800 | 5 | 1500 | 2.0 | 35 |
| 2 | 7 | 1600 | 4 | 1300 | 1.0 | 22 |
| 3 | 10 | 1750 | 6 | 1450 | 1.5 | 40 |
| 4 | 1 | 1700 | 8 | 1500 | 3.0 | 11 |
| 5 | 10 | 1650 | 5 | 1300 | 2.0 | 49 |
| 6 | 7 | 1800 | 3 | 1250 | 1.0 | 41 |
| 7 | 4 | 1650 | 2 | 1400 | 1.0 | 12 |
| 8 | 6 | 1800 | 9 | 1500 | 3.0 | 16 |
| 9 | 9 | 1750 | 1 | 1250 | 2.0 | 38 |
| 10 | 3 | 1700 | 6 | 1350 | 1.0 | 26 |
| 11 | 7 | 1800 | 7 | 1400 | 3.0 | 29 |
| 12 | 5 | 1750 | 4 | 1500 | 2.0 | 44 |
| 13 | 5 | 1750 | 4 | 1500 | 3.0 | 50 |
| 14 | 7 | 1600 | 5 | 1350 | 1.0 | 37 |
| 15 | 9 | 1800 | 6 | — | — | — |
| 16 | 6 | 1650 | 11 | 1520 | 1.0 | 11 |
| 17 | 4 | 1700 | 8 | 1450 | 1.0 | 9 |
| 18 | 5 | 1700 | 7 | 1400 | 1.0 | 20 |
| 19 | 5 | 1800 | 30 | — | — | — |

Additionally, cutting performance was evaluated under the following conditions using the obtained cutting tool having an RNGN1204 shape.
Processing method: Turning processing
Cut material: Inconel® 718 50φ round bar
Cutting speed: 200 m/minute
Feed rate: 0.15 mm/rev
Depth of cut 1.0 mm
Cutting conditions: Wet cutting
Evaluated item: Amount of boundary wear after 5 minutes of cutting was measured, and the state of the tip of the blade was observed.
Results are shown in Table 2.

chipping occurred on the cutting edge, flaking occurred facing toward the rake face, and boundary wear was large on the flank face.

In contrast, in sample nos. 1 to 11, which were within the scope of the present invention, cutting performance was exhibited wherein the amount of wear was small and there was little chipping of the tip of the blade and flaking toward the rake face.

Working Example 2

As starting raw materials, silicon nitride ($Si_3N_4$) powder of average grain size 1.2 μm, aluminum oxide ($Al_2O_3$)

TABLE 2

| Sample no. | Sintered body (volume %) | | Residual stress (tension) | | | Cutting test | |
|---|---|---|---|---|---|---|---|
| | Silicon nitride-based phase | Titanium nitride phase | Rake face (MPa) | Flank face (MPa) | Difference (MPa) | Wear width (mm) | State of cutting edge |
| 1 | 70.7 | 17.6 | 297 | 232 | 65 | 0.18 | Good |
| 2 | 73.6 | 10.2 | 130 | 109 | 21 | 0.28 | Good |
| 3 | 68.0 | 19.3 | 324 | 246 | 78 | 0.15 | Good |
| 4 | 50.3 | 30.0 | 400 | 110 | 290 | 0.29 | Good |
| 5 | 58.2 | 24.9 | 297 | 211 | 86 | 0.24 | Good |
| 6 | 82.8 | 15.1 | 215 | 130 | 85 | 0.28 | Good |
| 7 | 62.1 | 25.3 | 210 | 101 | 109 | 0.27 | Good |
| 8 | 81.5 | 14.1 | 266 | 250 | 16 | 0.27 | Good |
| 9 | 65.9 | 21.4 | 302 | 204 | 98 | 0.21 | Good |
| 10 | 66.7 | 23.3 | 380 | 350 | 30 | 0.25 | Good |
| 11 | 64.6 | 21.9 | 310 | 249 | 61 | 0.2 | Good |
| 12 | 83.5 | 9.9 | 484 | 473 | 11 | — | Sudden insert fracture |
| 13 | 59.2 | 30.1 | 90 | 88 | 2 | 0.58 | Large boundary wear |
| 14 | 49.7 | 29.4 | 126 | 89 | 37 | 0.61 | Large boundary wear |
| 15 | 78.7 | 14.1 | 182 | 375 | −193 | 0.41 | Chipping |
| 16 | 74.5 | 19.5 | 284 | 441 | −157 | 0.49 | Large boundary wear |
| 17 | 73.8 | 15.1 | 234 | 234 | 0 | 0.37 | Flaking |
| 18 | 68.1 | 21.1 | 473 | 502 | −29 | 0.52 | Large boundary wear |
| 19 | 76.6 | 16.2 | 113 | 118 | −5 | 0.48 | Flaking |

According to the results shown in Tables 1 and 2, sudden insert fracture occurred in sample no. 12, in which the content ratio of titanium nitride phase was less than 10 volume %, and boundary wear was large in sample no. 13, in which the content ratio of titanium nitride phase was greater than 30 volume %, and in sample no. 14, in which the content ratio of silicon nitride-based phase was less than 50 volume %. In sample no. 15, in which there was no holding at a holding temperature after the firing temperature, in sample no. 16, in which temperature decrease rate 1 was faster than 9° C./minute, in sample no. 17, in which temperature decrease rate 2 was slower than 10° C./minute, in sample no. 19, in which the temperature was decreased from the firing temperature at a rate faster than the range of temperature decrease 1 and without holding at a holding temperature, and in sample no. 18, in which raw density on the rake face side was lower than raw density on the flank face side, the tensile stress applied to the titanium nitride phase on the rake face was not greater than the tensile stress applied to the titanium nitride phase on the flank face, and powder of average grain size 0.7 μm, aluminum nitride (AlN) powder of average grain size 1.5 μm, yttrium oxide ($Y_2O_3$) of average grain size 1.0 μm, silicon oxide ($SiO_2$) of average grain size 1.0 μm, and titanium nitride (TiN) powder of average grain size 1.0 μm were compounded in the proportions shown in Table 3, and after a binder and solvent were added, they were ground and mixed for 72 hours by attritor milling.

After that, granulated powder was produced by drying to remove the solvent, and this granulated powder was packed into a press molding die having an RNGN120412 shape. Then, it was press molded under a compacting load of 3000 kg while adjusting the movement speed of the upper and lower punches and the time for which load was applied. The raw density ratio of Working Example 1 was 1.035. Then, $Si_3N_4$ powder of average grain size 3 μm and $MnO_2$ powder of average grain size 3 μm mixed in a ratio of 1:20, organic resin was added to this, and Mn paste coating was implemented by applying the obtained paste to the surface of the powder compact using a brush. Results are shown in Table 3.

Next, the powder compact was put in a saggar, and after degreasing, the interior of the firing furnace was set to 909 kPa (9 atm) of nitrogen, and it was fired at the firing temperature and for the firing time shown in Table 3. The temperature decrease rate from the firing temperature to the holding temperature of from 1450 to 1600° C. was 5° C./minute, and it was held at the holding temperature and for the holding time shown in Table 3, and then the temperature decrease rate from the holding temperature to room temperature was 50° C./minute. Additionally, on the surfaces of the sintered body, the rake face underwent double-disc grinding processing, the flank face underwent circumferential grinding processing, and the cutting edge underwent chamfer honing processing so as to result in a 0.10 mm×20° shape using an elastic grindstone, to produce cutting tools of sample nos. 20 to 36.

Note that in the sintered bodies of all of sample nos. 20 to 36, parts of the silicon nitride-based phase present were β-SiAlON and α-SiAlON.

TABLE 3

| Sample no. | Compounding composition (mass %) | | | | | | Mn paste coating |
|---|---|---|---|---|---|---|---|
| | $Si_3N_4$ | $Al_2O_3$ | AlN | $Y_2O_3$ | TiN | Other | |
| 20 | 61.5 | 1.5 | 4.0 | 6.0 | 27.0 | — | Yes |
| 21 | 62.5 | 1.5 | 5.0 | 7.0 | 24.0 | — | Yes |
| 22 | 69.5 | 3.0 | 2.0 | 5.0 | 20.5 | — | Yes |
| 23 | 56.5 | 3.0 | 4.0 | 7.5 | 29.0 | — | Yes |
| 24 | 55.0 | 4.5 | 4.0 | 6.5 | 30.0 | — | Yes |
| 25 | 77.0 | 1.0 | 3.0 | 6.0 | 13.0 | — | Yes |
| 26 | 72.5 | 2.0 | 5.0 | 8.0 | 10.5 | $SiO_2$: 2.0 | Yes |
| 27 | 80.0 | 5.0 | 5.0 | 5.0 | 12.0 | — | Yes |
| 28 | 78.0 | 2.0 | 5.0 | 5.0 | 10 | — | Yes |
| 29 | 72.0 | 2.5 | 3.0 | 8.0 | 10.5 | $SiO_2$: 4.0 | Yes |
| 30 | 73.0 | 1.5 | 2.5 | 3.0 | 20 | — | Yes |
| 31 | 72.0 | 1.5 | 1.5 | 10.0 | 15 | — | Yes |
| 32 | 78.0 | 4.0 | 0.0 | 4.0 | 14 | — | Yes |
| 33 | 57.0 | 3.0 | 6.0 | 4.0 | 30 | — | Yes |
| 34 | 57.5 | 4.0 | 5.0 | 7.0 | 25 | $WO_3$: 1.5 | Yes |
| 35 | 67.0 | 1.0 | 3.0 | 7.0 | 22 | — | No |
| 36 | 68.0 | 2.0 | 3.0 | 7.0 | 20 | — | Yes |

| Sample no. | Firing conditions | | | |
|---|---|---|---|---|
| | Firing temperature (° C.) | Holding time (hours) | Holding temperature (° C.) | Holding time (hours) |
| 20 | 1750 | 8 | 1500 | 1.5 |
| 21 | 1700 | 8 | 1525 | 2.0 |
| 22 | 1775 | 9 | 1550 | 3.5 |
| 23 | 1675 | 7 | 1475 | 1.2 |
| 24 | 1800 | 6 | 1575 | 4.0 |
| 25 | 1675 | 6 | 1475 | 1.0 |
| 26 | 1725 | 8 | 1575 | 2.5 |
| 27 | 1700 | 5 | 1450 | 2.0 |
| 28 | 1700 | 8 | 1600 | 3.0 |
| 29 | 1800 | 5 | 1450 | 2.0 |
| 30 | 1750 | 8 | 1550 | 2.5 |
| 31 | 1675 | 6 | 1450 | 2.0 |
| 32 | 1800 | 10 | 1600 | 3.5 |
| 33 | 1650 | 5 | 1450 | 1.5 |
| 34 | 1600 | 4 | 1450 | 0.5 |
| 35 | 1700 | 7 | 1500 | 2.0 |
| 36 | 1750 | 6 | — | — |

For the obtained silicon nitride-based sintered body, X-ray diffraction peaks were measured on the rake face in the unpolished state (surface) and polished state polished to 1000 μm (interior). The peak intensity ratio of the total of peaks indicating silicon nitride-based phase to the total of all measured peaks, the peak intensity ratio of the total of peaks indicating a melilite phase to the total of all measured peaks, the peak intensity ratio of peaks indicating the melilite phase (201) face to the total of all peaks indicating the melilite phase, and the peak intensity ratio of the total of peaks indicating the YAG phase to the total of all measured peaks were each determined. The surface-to-interior ratio of each of these values was determined. This is denoted as "ratio" in the tables. Results are shown in Tables 4 and 5. Furthermore, by scanning electron microscope (SEM) it was ascertained that not less than 50 volume % silicon nitride phase was present in all samples.

TABLE 4

| Sample No | Sintered body composition (volume %) | | | Silicon nitride-based phase peak intensity ratio | | |
|---|---|---|---|---|---|---|
| | $Si_3N_4$ + SiAlON | TiN phase | Grain boundary phase | Surface peak | Interior peak | Ratio |
| 20 | 70.98 | 18.90 | 10.12 | 0.052 | 0.567 | 0.092 |
| 21 | 71.32 | 16.80 | 11.88 | 0.049 | 0.542 | 0.090 |
| 22 | 76.85 | 14.35 | 8.80 | 0.059 | 0.601 | 0.098 |
| 23 | 66.94 | 20.30 | 12.76 | 0.060 | 0.599 | 0.100 |
| 24 | 65.80 | 21.00 | 13.20 | 0.053 | 0.562 | 0.094 |
| 25 | 80.70 | 10.50 | 8.80 | 0.048 | 0.576 | 0.083 |
| 26 | 74.89 | 10.15 | 14.96 | 0.062 | 0.612 | 0.101 |
| 27 | 75.60 | 11.20 | 13.20 | 0.289 | 0.574 | 0.503 |
| 28 | 78.94 | 10.50 | 10.56 | 0.332 | 0.517 | 0.642 |
| 29 | 73.75 | 10.85 | 15.40 | 0.341 | 0.601 | 0.567 |
| 30 | 79.84 | 14.00 | 6.16 | 0.452 | 0.684 | 0.661 |
| 31 | 78.06 | 10.50 | 11.44 | 0.323 | 0.522 | 0.619 |
| 32 | 82.81 | 10.15 | 7.04 | 0.713 | 0.781 | 0.913 |
| 33 | 67.56 | 21.00 | 11.44 | 0 | 0.561 | 0.000 |
| 34 | 67.10 | 17.50 | 15.40 | 0.581 | 0.563 | 1.032 |
| 35 | 74.92 | 15.40 | 9.68 | 0.438 | 0.518 | 0.846 |
| 36 | 75.44 | 14.00 | 10.56 | 0.518 | 0.565 | 0.917 |

| Sample No | Melilite phase peak intensity ratio | | |
|---|---|---|---|
| | Surface peak | Interior peak | Ratio |
| 20 | 0.489 | 0.101 | 4.84 |
| 21 | 0.491 | 0.114 | 4.31 |
| 22 | 0.496 | 0.111 | 4.47 |
| 23 | 0.501 | 0.118 | 4.25 |
| 24 | 0.481 | 0.107 | 4.50 |
| 25 | 0.485 | 0.103 | 4.71 |
| 26 | 0.478 | 0.099 | 4.83 |
| 27 | 0.461 | 0.266 | 1.73 |
| 28 | 0.677 | 0.113 | 5.99 |
| 29 | 0.345 | 0.114 | 3.03 |
| 30 | 0.687 | 0.101 | 6.80 |
| 31 | 0.328 | 0.261 | 1.26 |
| 32 | 0.221 | 0.115 | 1.92 |
| 33 | 0.721 | 0.118 | 6.11 |
| 34 | 0.321 | 0.276 | 1.16 |
| 35 | 0.218 | 0.231 | 0.94 |
| 36 | 0.385 | 0.188 | 2.05 |

TABLE 5

| Sample No | Melilite (201) face peak intensity ratio | | | YAG (420) face peak intensity ratio | | |
|---|---|---|---|---|---|---|
| | Surface peak | Interior peak | Ratio | Surface peak | Interior peak | Ratio |
| 20 | 0.156 | 0.115 | 1.36 | 0.0107 | 0.0121 | 0.88 |
| 21 | 0.158 | 0.111 | 1.42 | 0.0125 | 0.0129 | 0.97 |
| 22 | 0.147 | 0.119 | 1.24 | 0.0134 | 0.0135 | 0.99 |
| 23 | 0.161 | 0.104 | 1.55 | — | — | — |
| 24 | 0.155 | 0.109 | 1.42 | 0.0132 | 0.0136 | 0.97 |
| 25 | 0.159 | 0.121 | 1.31 | — | — | — |
| 26 | 0.153 | 0.117 | 1.31 | 0.0087 | 0.0085 | 1.02 |
| 27 | 0.124 | 0.117 | 1.06 | — | — | — |

TABLE 5-continued

| | | | | | | |
|---|---|---|---|---|---|---|
| 28 | 0.128 | 0.101 | 1.27 | 0.0143 | 0.0152 | 0.94 |
| 29 | 0.132 | 0.119 | 1.11 | 0.0059 | 0.0057 | 1.04 |
| 30 | 0.126 | 0.121 | 1.04 | — | — | — |
| 31 | 0.183 | 0.092 | 1.99 | 0.0095 | 0.0101 | 0.94 |
| 32 | 0.134 | 0.121 | 1.11 | 0.0138 | 0.0136 | 1.01 |
| 33 | 0.172 | 0.157 | 1.10 | — | — | — |
| 34 | 0.145 | 0.137 | 1.06 | — | — | — |
| 35 | 0.136 | 0.129 | 1.05 | 0.0125 | 0.0123 | 1.02 |
| 36 | 0.173 | 0.184 | 0.94 | — | — | — |

| | TiN (111) face peak intensity ratio | | |
|---|---|---|---|
| Sample No | Surface peak | Interior peak | Ratio |
| 20 | 0.402 | 0.355 | 1.13 |
| 21 | 0.379 | 0.346 | 1.10 |
| 22 | 0.399 | 0.332 | 1.20 |
| 23 | 0.385 | 0.313 | 1.23 |
| 24 | 0.339 | 0.306 | 1.11 |
| 25 | 0.323 | 0.278 | 1.16 |
| 26 | 0.193 | 0.176 | 1.10 |
| 27 | 0.312 | 0.302 | 1.03 |
| 28 | 0.281 | 0.270 | 1.04 |
| 29 | 0.223 | 0.298 | 0.75 |
| 30 | 0.381 | 0.356 | 1.07 |
| 31 | 0.198 | 0.281 | 0.70 |
| 32 | 0.138 | 0.209 | 0.66 |
| 33 | 0.421 | 0.403 | 1.04 |
| 34 | 0.422 | 0.393 | 1.07 |
| 35 | 0.371 | 0.378 | 0.98 |
| 36 | 0.236 | 0.355 | 0.66 |

Furthermore, similar to Working Example 1, residual stress of titanium nitride on the rake face and the flank face was measured. Additionally, cutting performance was evaluated under the following conditions using the obtained cutting tool having an SNGN120412 shape. Results are shown in Table 6.

Processing method: Turning processing
Cut material: Inconel® 718 200ϕ round bar
Cutting speed: 400 m/minute
Feed rate: 0.10 mm/rev
Depth of cut 1.0 mm
Cutting conditions: Wet cutting Evaluated item: Tool life by measuring cutting time resulting in wear quantity of 0.3 mm. The state of the cutting edge was also observed at the point when the tool life was reached.

TABLE 6

| | Residual stress (tension) | | | Cutting test | |
|---|---|---|---|---|---|
| Sample No | Rake face (MPa) | Flank face (MPa) | Difference | Tool life (minutes) | State of cutting edge |
| 20 | 324 | 250 | 74 | 3.0 | No abnormalities |
| 21 | 321 | 234 | 87 | 2.8 | No abnormalities |
| 22 | 290 | 254 | 36 | 2.5 | No abnormalities |
| 23 | 311 | 234 | 77 | 2.3 | No abnormalities |
| 24 | 290 | 223 | 67 | 2.2 | No abnormalities |
| 25 | 309 | 229 | 80 | 2.1 | No abnormalities |
| 26 | 343 | 222 | 121 | 2.0 | No abnormalities |
| 27 | 349 | 249 | 100 | 1.8 | No abnormalities |
| 28 | 298 | 234 | 64 | 1.9 | No abnormalities |
| 29 | 201 | 184 | 17 | 1.8 | Tiny chipping |
| 30 | 324 | 235 | 89 | 1.9 | No abnormalities |
| 31 | 315 | 178 | 137 | 1.7 | Tiny chipping |
| 32 | 333 | 243 | 90 | 1.7 | Tiny chipping |
| 33 | 343 | 223 | 120 | 1.6 | No abnormalities |

TABLE 6-continued

| | Residual stress (tension) | | | Cutting test | |
|---|---|---|---|---|---|
| Sample No | Rake face (MPa) | Flank face (MPa) | Difference | Tool life (minutes) | State of cutting edge |
| 34 | 200 | 210 | −10 | 0.1 | Initial fracture |
| 35 | 225 | 276 | −51 | 0.5 | Chipping |
| 36 | 178 | 190 | −12 | 0.5 | Flaking |

According to the results shown in Tables 3 to 6, a stable cutting tool with a long life and almost no damage to the cutting edge was obtained in sample nos. 20 to 33, which contained a proportion of from 10 to 30 volume % titanium nitride phase, and in which tensile stress applied to the titanium nitride phase on the rake face was greater than the tensile stress applied to the titanium nitride phase on the flank face. On the other hand, in sample nos. 34 to 36, which were outside the scope of the present invention, damage to the cutting edge was seen at an early stage, and because of this damage, wear proceeded, resulting in a short tool life.

REFERENCE NUMBER

1 Tool (throw-away tip)
2 Rake face
3 Flank face
4 Cutting edge

What is claimed is:

1. A cutting tool with a rake face, a flank face, and a cutting edge that is an intersection ridge portion of the rake face and the flank face, comprising:
   a silicon nitride-based sintered body containing not less than 50 volume % silicon nitride-based phase and from 10 to 30 volume % titanium nitride phase,
   wherein a residual stress of the titanium nitride phase included in the silicon nitride-based sintered body is a tensile stress and the tensile stress of the titanium nitride phase on the rake face is greater than the tensile stress of the titanium nitride phase on the flank face.

2. The cutting tool according to claim 1,
   wherein the silicon nitride-based sintered body further includes a melilite ($Y_2Si_3O_3N_4$) phase, and, in X-ray diffraction measurement of the silicon nitride-based sintered body, a peak intensity ratio of a peak of the silicon nitride-based phase relative to total peaks on a surface is smaller than a peak intensity ratio of a peak of the silicon nitride-based phase relative to total peaks on an interior, a peak intensity ratio of a peak of the melilite phase relative to the total peaks on the surface is greater than a peak intensity ratio of a peak of the melilite phase relative to the total peaks on the interior, and a peak intensity ratio of a peak of a (201) face relative to total melilite peaks of the melilite phase on the surface is greater than a peak intensity ratio of a peak of the (201) face relative to a total melilite peaks of the melilite phase on the interior.

3. The cutting tool according to claim 2, wherein 0.05 to 0.5 is a ratio of the peak intensity ratio of the peak of the silicon nitride-based phase relative to the total peaks on the surface to the peak intensity ratio of the peak of the silicon nitride-based phase relative to the total peaks on the interior.

4. The cutting tool according to claim 2, wherein 3.0 to 6.0 is a ratio of the peak intensity ratio of the peak of the melilite phase relative to the total peaks on the surface to the peak intensity ratio of the peak of the melilite phase relative to the total peaks on the interior.

5. The cutting tool according to claim 2, wherein 1.1 to 2.0 is a ratio of the peak intensity ratio of the peak of the (201) face relative to the total melilite peaks of the melilite phase on the surface to the peak intensity ratio of the peak of the (201) face relative to the total melilite peaks of the melilite phase on the interior.

6. The cutting tool according to claim 2, wherein a peak intensity ratio of a peak of a (111) face relative to total titanium nitride peaks of the titanium nitride phase on the surface is greater than a peak intensity ratio of a peak of the (111) face relative to total titanium nitride peaks of the titanium nitride phase on the interior.

7. The cutting tool according to claim 6, wherein 1.1 to 1.4 is a ratio of the peak intensity ratio of the peak of the (111) face relative to the total titanium nitride peaks of the titanium nitride phase on the surface to the peak intensity ratio of the peak of the (111) face relative to the total titanium nitride peaks of the titanium nitride phase on the interior.

8. The cutting tool according to claim 2, wherein the silicon nitride-based sintered body further includes a YAG ($3Y_2O_3 \cdot 5Al_2O_3$) phase, and 0.9 to 1.1 is a ration of a peak intensity ratio of a peak of a (420) face of the YAG phase relative to total peaks on the surface to a peak intensity ratio of a peak of the (420) face of the YAG phase relative to total peaks on the interior.

9. The cutting tool according to claim 1, further comprising a hard coating layer on a surface of the silicon nitride-based sintered body.

* * * * *